Nov. 15, 1927.                                        1,648,984
O. E. ENELL
PRUNING SHEARS
Filed Jan. 28, 1927

Inventor
Otto E. Enell
By W. D. McDowell.
Attorney

Patented Nov. 15, 1927.

1,648,984

UNITED STATES PATENT OFFICE.

OTTO E. ENELL, OF LOS ANGELES, CALIFORNIA, ASSIGNOR TO HENRY M. BRUNER, J. A. SCHEFFER, AND HARRY L. McCLURE, TRUSTEES.

PRUNING SHEARS.

Application filed January 28, 1927. Serial No. 164,334.

This invention relates to improvements in pruning shears of the type especially adapted for pruning and cutting hedges, shrubbery, tree branches and the like, and the primary object of the invention resides in the provision of a tool of this character wherein a novel organization of parts is provided permitting of ease and convenience in the manual operation of the tool but at the same time a powerful and effective cutting operation or capacity, this object being obtained primarily through the provision of pivotally mounted blades carried in connection with pivotally related operating members, the said operating members in turn carrying pivotally mounted levers, which are also pivotally connected with said blades, whereby upon the operation of said members, by hand pressure of the user, the applied power will be effectively transmitted to the blade to secure powerful and efficient operation thereof with minimum exertion on the part of the user.

With these and other objects in view, as will appear as the description proceeds, the invention consists in the novel features of construction, combinations of elements and arrangements of parts hereinafter to be fully described and pointed out in the appended claims.

Figure 1:
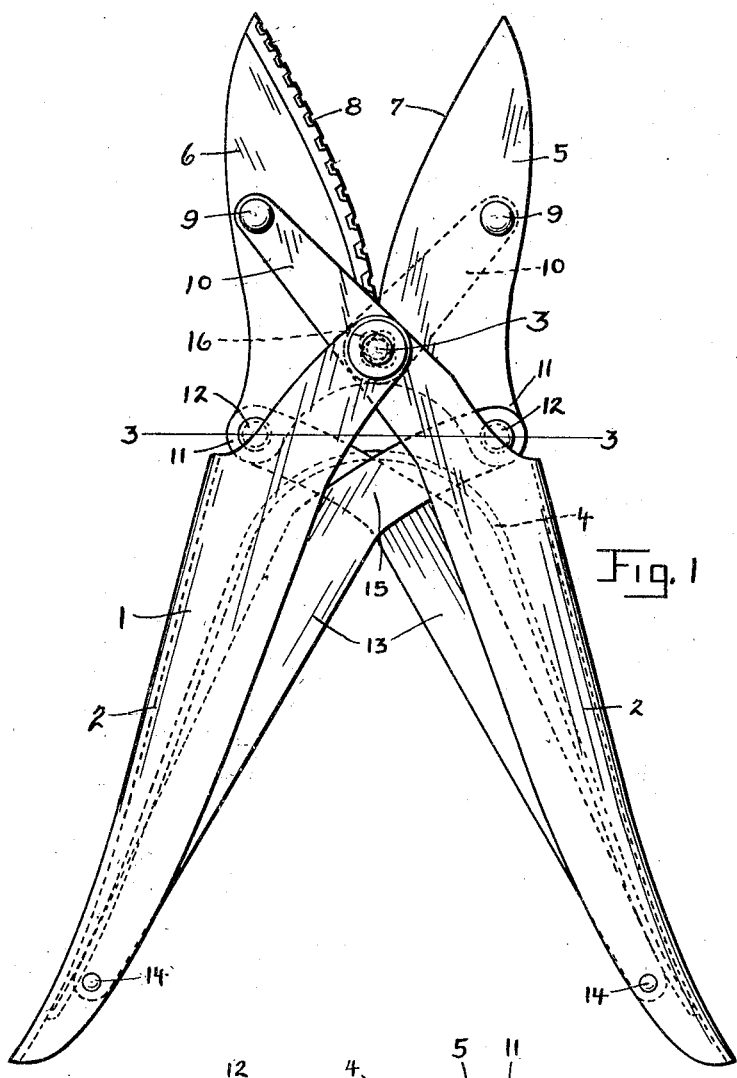
Figure 2:
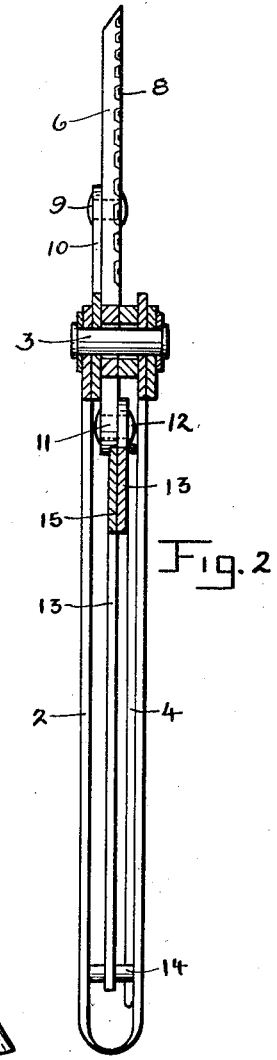
Figure 3:
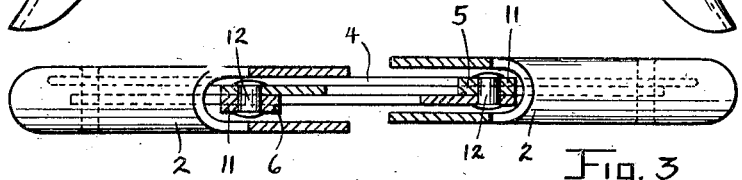
Figure 4:
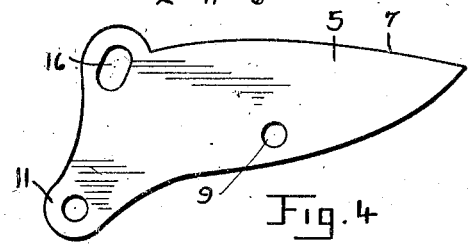

In the accompanying drawing:

Figure 1 is a side elevation of a pair of pruning shears formed in accordance with the present invention, Figure 2 is a vertical transverse sectional view taken through the same on the line 2—2 of Figure 1, Figure 3 is a transverse sectional view taken on the line 3—3 of Figure 1, Figure 4 is a side elevation of one of the cutting blades.

Referring more particularly to the drawings, the numeral 1 designates a pair of pruning shears formed in accordance with the features of the present invention. As preferably constructed these shears are formed to include a pair of operating members 2 which are formed from stamped sheet metal and in transverse cross-section of substantially U form. The members 2 occupy normally relatively angular positions and at their point of intersection are pivotally connected by means of the stud or rivet 3, about the axis of which said members are adapted to oscillate. Arranged in the walls of said members is a stiff U shaped wire spring 4, which presses outwardly upon said members to maintain the latter normally in a separated state.

Also pivotally mounted in connection with the stud 3 is a pair of blades, indicated by the numerals 5 and 6. The blade 5 in this instance is provided with a curved, sharp inner cutting edge, indicated by the numeral 7, while the complemental edge portion 8 of the opposite blade 6 is notched or otherwise roughened so as to provide a multiplicity of recesses, in which the twigs, branches of the shrubbery or the like being cut are adapted to be received and held momentarily so as to secure a better cutting action on the part of the edge 7 of the blade 5. The blades intermediate of their length are pivotally connected as at 9 with the outer ends of the actuating extremities 10 formed upon the upper end of the members 2, the exterminus end being formed upon but one side of each of said members, you notice that said extremities may be positioned more closely adjacent to the particular blades with which they are pivotally connected.

The lower ends of the blades 5 and 6 are movably positioned between the spaced side walls formed at the point of intersection of said members, and include relatively offset ears 11, which are apertured to receive pins 12 employed in pivotally connecting said ears with the upper ends of a pair of crossed lever elements 13. These elements have their lower ends pivotally connected as at 14 to the corresponding ends of the operating handles or members 2 and in general the said elements are located in the pockets provided by the U form of the members 2, in order that the lever elements will be out of the way and will not interfere with the grip of the operator. The lever elements cross one another as indicated at 15, immediately below the point of intersection of the members 2, but in the case of the lever elements no direct pivotal connection is provided at their points of intersection, the said elements merely moving past each other without interference.

In view of the foregoing it will be seen that by gripping the operating members 2 and exerting hand pressure thereon, the said members will be rocked upon their common pivotal axis 3 against the resistance offered by the spring 4, so as to effect relative approach between the complemental edges of the blade. In addition to this movement a shearing motion is imparted to the blade by the inclusion of the lever elements 13 which, by reason of their pivotal connection with the actuating members 2 and the lower ends of the blades, produce an additional rocking action of said blades about the stud 3, and this movement is augmented by providing each of the blades with elongated slots 16 for the reception of the shank of the stud 3, whereby a wiping or shearing action is imparted to said blades while the latter are travelling in unison with the actuating extremities 10 of the operating members. This compound motion produces a quick, easily executed clean cutting movement which is very effective in tools of this character, and renders the same very easy and convenient to operate. Upon release of the actuating members the latter return to normal positions automatically by the action of the spring 4. The construction, it will be observed, is very substantial and durable and is very well proportioned and balanced. Of course, it will be understood that various changes may be made in the construction as herein specifically set forth and described without departing from the fundamental spirit or principle of the invention. For example, the operating handles or members 2 may be of any desired length or equipped with extensions so that the tool may be adapted for various purposes without changing in any way the operating principles above set forth. In the above description the terms upper and lower have been used merely for the sake of convenience and accuracy in description and because of the position which the tool has been shown as occupying in Figure 1 of the drawing. Therefore, the terms upper and lower have not been used in a limiting sense.

What is claimed is:

1. A tool of the character set forth, comprising a pair of operating members pivotally connected at their points of intersection, spring means tending to maintain said operating members separated, a pair of blades pivotally connected at positions intermediate the length thereof to the upper ends of said operating members, and a pair of crossed links pivotally mounted in connection with the lower portion of said operating members, said links having the upper ends thereof crossed and pivotally connected with the lower ends of said blades.

2. A tool of the character set forth, comprising a pair of operating members pivotally connected at an intersecting position, spring means tending to maintain said operating members separated, a pair of blades pivotally connected with said operating members at their points of intersection and also at additional points intermediate of the length of said blades, and a pair of lever elements pivotally connected with said operating members and with the inner or lower ends of said blades.

3. A tool of the character set forth, comprising a pair of angularly disposed operating members pivotally connected at their points of intersection, spring means tending to maintain said handle members separated, a pair of blades pivotally connected with said operating members at the point of intersection of the latter and also additionally pivotally connected with said operating members at the extreme upper ends of the latter and at points intermediate of the length of said blades, each of said blades having an elongated slot formed therein to receive the shank of the pivotal connection uniting the intersecting portions of said operating members, and a pair of crossed links having the lower ends thereof pivoted to said operating members and the upper ends thereof pivoted to the extreme lower end of said blades.

4. A tool of the character set forth, comprising a pair of crossed operating members pivotally united at their point of intersection, a pair of blades pivotally connected with said operating members at the points of intersection of the latter, there being additional pivotal connections between the extreme upper ends of said operating members and the intermediate portion of said blade, and a pair of crossed lever elements having the lower ends thereof pivotally connected with said operating members and the upper ends thereof pivotally connected with the extreme lower ends of said blades.

5. A tool of the character set forth, comprising a pair of operating members pivoted for relative movement about a common axis, said members being provided with projecting extremities above said axis, a pair of blades pivoted to said operating members for turning movement about said axis, pivotal connections between the outer ends of said actuating extremities and the intermediate portions of said blades, and a pair of lever elements pivotally connected at their lower ends to said operating members and pivotally connected at their upper ends to the lower portion of said blades.

6. A tool of the character set forth, comprising a pair of angularly disposed operating members pivotally united for swinging movement about a common axis, said members being substantially U shaped in cross section, a pair of blades mounted for rocking movement about said axis, pivotal connections between intermediate portions of said blades and the extreme upper ends of said operating members, and a pair of levers mounted substantially within the confines of said U shaped operating members and having the lower ends thereof pivotally connected with said operating members and the upper ends thereof pivotally connected with the lower portions of said blades.

In testimony whereof I affix my signature.

OTTO E. ENELL.